Figure 1:
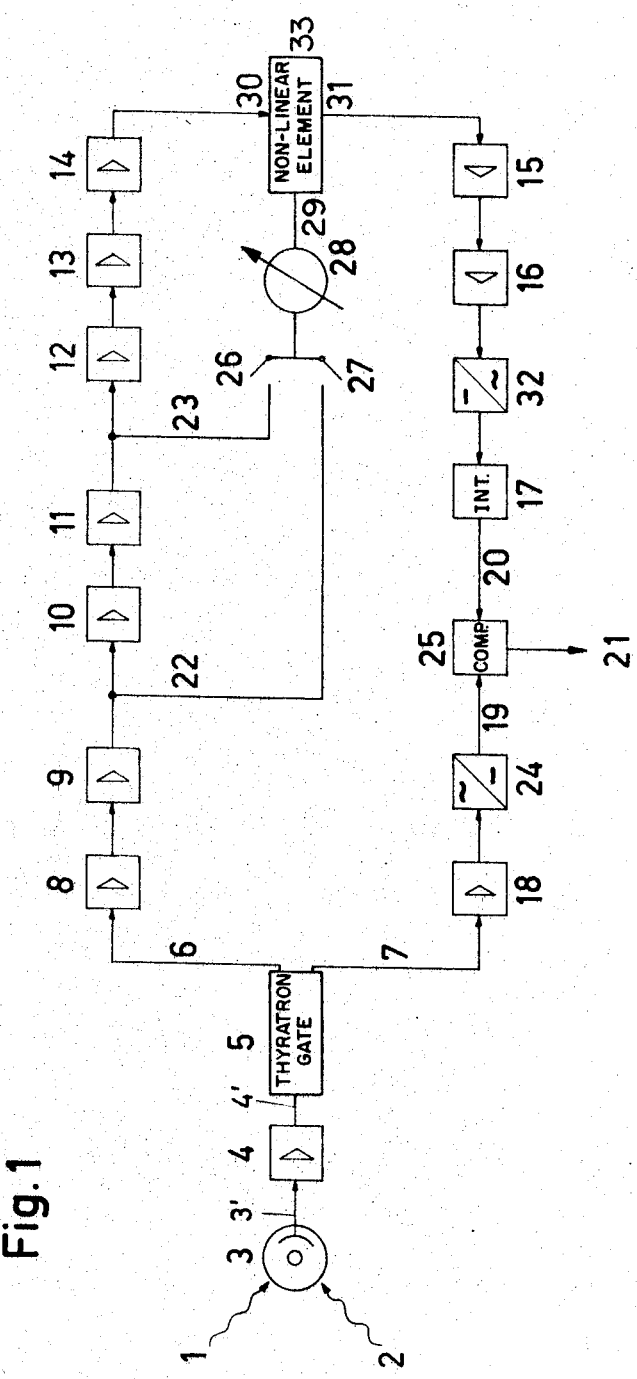

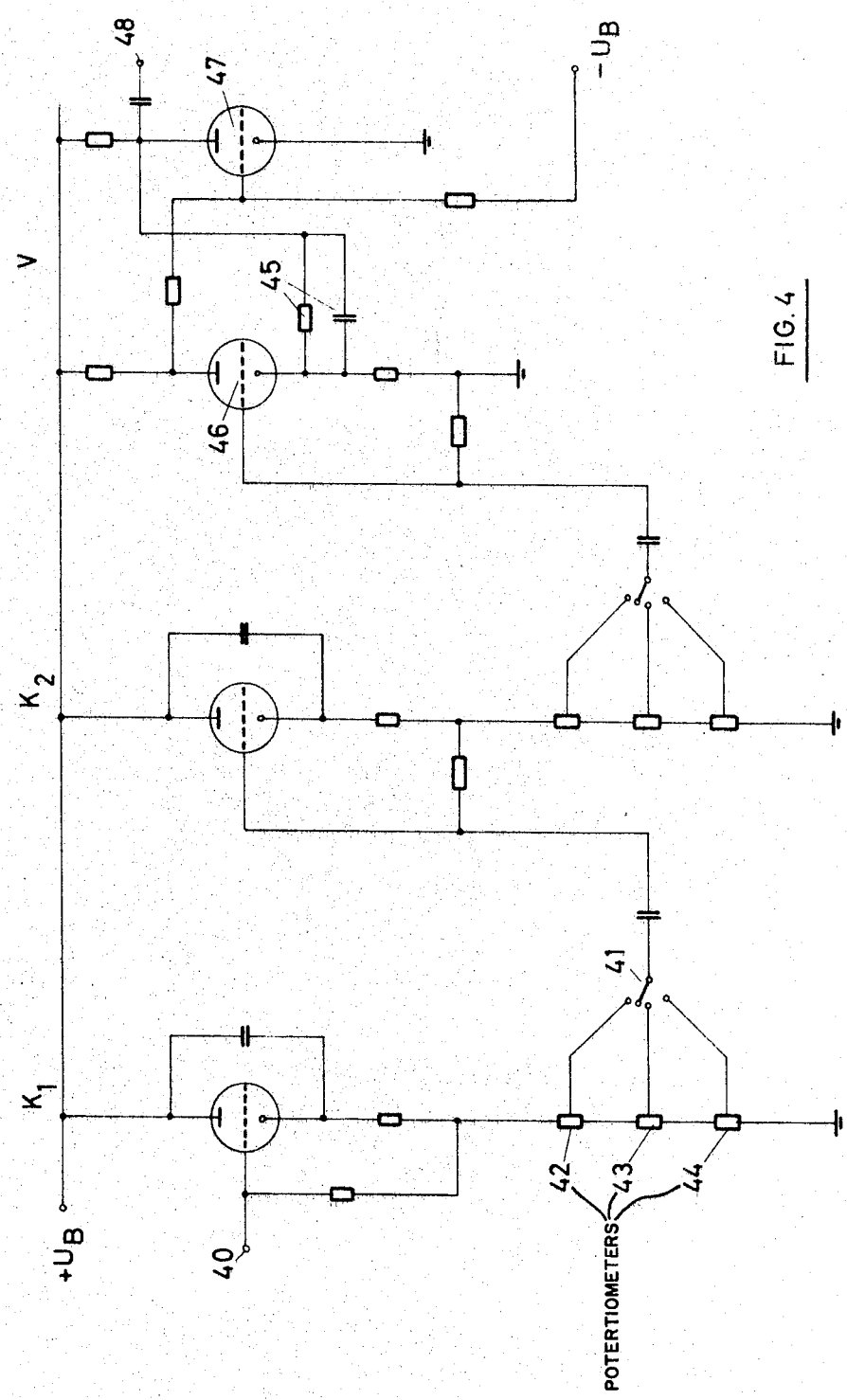

United States Patent Office 3,298,296
Patented Jan. 17, 1967

3,298,296
APPARATUS FOR AUTOMATICALLY CONTROLLING EXPOSURE IN PHOTOGRAPHIC PRINTING MACHINES
Hansjuerg Mey, Oberengstringen, Switzerland, assignor to Gretag Aktiengesellschaft, Regensdorf, Switzerland
Filed Mar. 13, 1964, Ser. No. 351,622
Claims priority, application Switzerland, Mar. 15, 1963, 3,284/63
20 Claims. (Cl. 95—73)

This invention relates to apparatus for automatically controlling exposure in photographic printing machines.

Automatic exposure control systems in photographic printing machines serve to calculate and control exposure times from the indication of measurements of the mean transparency measured over the total negative format or at least over the pictorially significant parts thereof, in such a way that the print paper is correctly exposed at constant luminosity of the exposure lamp.

When printing coloured negatives, it is necessary for the exposure times for each separation colour to be calculated individually, and the exposure time for the blue printing light is calculated, let us say, on the basis of the transparency of the yellow portions of the negative in order to control the yellow colour of the positive print; similarly, green printing light and a magenta negative emulsion layer are required for the magenta positive colour, and red printing light and a blue-green negative emulsion layer for the blue-green positive colour. It is irrelevant here to the subject of the invention whether the exposure occurs consecutively or simultaneously, additively or subtractively.

The sources of error which result from the manufacture of the negative up to the finally dried print are numerous. Differences in the negative material, in the negative processing, in the printing light, in the print emulsion and processing of the print paper are met in addition to incorrect adjustments of diaphragm aperture and exposure time by the photographer. Apart from the fact that the average photographer can scarcely be expected to ascertain the exact light values by means of a calibrated and accurate exposure meter, it would not be economically justifiable to maintain constancy of all the technical processing factors. Furthermore, the permissable overall tolerances are extremely small, particularly in colour photography (approximately 5%).

For the above stated reasons, it has become general practice to correct, during the printing process, the errors and inaccuracies which occur on the way to the finished negative. In doing so, it is also intended simultaneously to make allowance for all the properties of the print manufacture from the exposure up to the developed and dried print. The control and correction properties of the exposure control system are further required to be adapted to the various sizes of negatives and positives.

In order to determine the correction properties listed, it is customary to demand a certain standardised appearance of the positive, irrespective of its pictorial content. A simple criterion can be found here so that the mean transparency of the positive is required to assume a predetermined value which is equal for all pictures. For colour positives, three such values have to be predetermined in analogous manner. The expression "means transparency" in this context is understood to mean, quite generally, the light emited by the entire picture format or by a previously determined pictorially significant (generally central) section, divided by the corresponding emission without blackening or colouration. It may therefore also refer to remission in the case of a non-transparent picture. The realisation of this criterion, which states in different terms that the variation of any one parameter (e.g., unduly long development of the negative) must be compensated by means of a variation of another parameter belonging to the printing process (e.g., variation in the exposure time) in such a way that the mean transparency of the print corresponds to a desired value which is independent of the picture content, nevertheless involves a number of difficulties. It is easy to understand that this process only operates in the case of strictly linear conditions (negative and positive in the linear part of the characteristic, $\gamma=1$), that there is no relation between printing values which have been found for one negative and another having a different pictorial composition, and lastly that the mean positive transparency cannot be measured at all in the print, but only the mean printing light time integral which generates it. (The relationship between the mean printing light time integral and the mean positive transparency depends upon the picture composition.)

Despite all objections, experience has shown that the predetermination of the mean printing light time integral (separately for the three printing colours in the case of coloured prints) leads to a high percentage of serviceable pictures. It is however necessary to refine the criterion inasmuch as the predetermined values for the mean printing light time integral are not kept constant but are themselves varied as a function of the properties of the picture to be printed.

A generally applied method of realising a predetermined mean printing light time integral consists in measuring, anywhere in the image forming ray path, the light passing through the negative during the printing, converting it into a current proportional thereto, integrating the latter in a condenser to a charge and hence to a voltage, and breaking off the exposure when a previously determined voltage is reached. This method is described in greater detail hereinbelow.

If the mean negative transparency (transparency ascertained over the total negative format or over a previously determined pictorially significant and usually central section) be designated $\overline{T}n$, and the light flux of the printing light source be designated $\phi_0$, then the output current $i$ of a photoelectric cell, assumed to be linear in operation, is given by the relation $$i = k \cdot S \cdot \phi_0 \cdot \overline{T}n$$

where $k$ denotes the fraction of the light used for the measurement and $S$ the current/light flux sensitivity of the photoelectric cell.

A condenser of capacitance C which is charged by the current $i$ exhibits a voltage $$u = \frac{i \cdot t}{C} = \frac{k \cdot S \phi_0 \overline{T} n \cdot t}{C}$$

For this purpose, it is assumed that the condenser is at zero voltage at the commencement of exposure. The time counting from the moment of commencing the exposure is designated $t$.

The exposure is required to be broken off when a predetermined voltage $u^*$ is reached. The exposure time $t_{\text{exp}}$ is then obtained as $$t_{\text{exp}} = \frac{1}{\overline{T}n} \cdot \frac{C}{\phi_0 \cdot k \cdot S} \cdot u^*$$

and the mean printing light time integral is thus $$L = t_{\text{exp}} \cdot \overline{T} n \cdot \phi_0 = \frac{C}{k \cdot S} \cdot u^*$$

The mean printing light time integral L is therefore actually constant, independently of the negative and of the printing light source, and is adjustable by the parameters C, $k$ and $u$. On the other hand, the printing light time integral L depends upon the sensitivity S of the photoelectric cell. This quantity is shown by experience to be subject to intolerable fluctuations (such as ageing and photoelectric fatigue).

It must also be regarded as a further disadvantage of this method that, due to the independence of the printing light time integral from the negative transparency, factors such as for instance the black plate effect are out of account. Methods have in fact been proposed whereby the printing light time integral L is varied as a function of the exposure time, or also the time function of the intergration can be modified. But in practice it is found that these variations are generally extremely difficult to adjust quantitatively and do not unconditionally remain valid in the case of format changes and/or changes of other parameters (e.g., emulsion charge) so that their efficacy is greatly reduced.

According to the present invention there is provided apparatus for controlling the exposure in a photographic printing machine of the kind in which the duration of exposure is controllable by measurement of light either passing through an original to be copied, or remitted by the original, comprising a first light source for illuminating the original, an additional light source adapted to provide an intesity reference, a photosensitive element intended to receive light passed from the original and light from the additional light source, means for directing at least a part of the printing light and the reference light alternately and for brief periods onto the photosensitive element which is adapted to transform the light pulses into elecrtical pulses, a thyratron arranged to receive these interlaced electrical pulse trains and to split them up into a picture pulse train and a reference pulse train, a comparator, two separate channels for feeding the split pulse trains to the comparator, at least one of these two channels containing amplifier means for multiplicatively influencing the signals, the gain factor (which may be greater than, equal to or less than unity) of said amplifier means being adjustable correspondingly to the required correction values, an integrator disposed at the end adjacent to the comportor of the picture pulse channel, and a switching-off device for the printing light connected to the output of the comparator. A non-linear element is preferably arranged at least in one of the two channels, while rectifiers may each be connected in series with the integrator and with the input of the comparator adjacent to the reference channel.

The present exposure control apparatus is independent of the sensitivity of the photoelectric cell. The correction values (parameters) can be adjusted independently of one another. These adjustments are simple and reproducible at all times. The dependency of the mean printing light time integral upon the relevant negativeis effectively and very simply adjustable.

Figure 2:
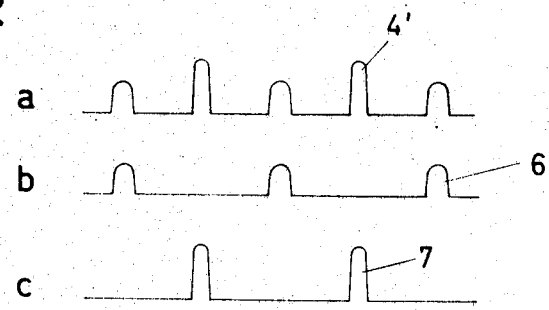
Figure 3:
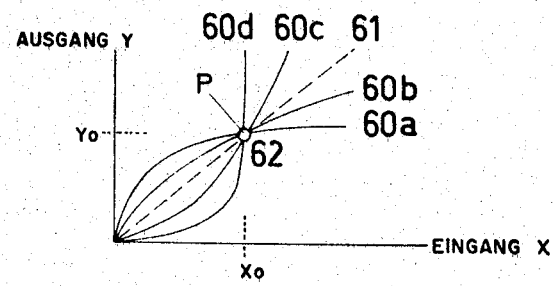
Figure 5:
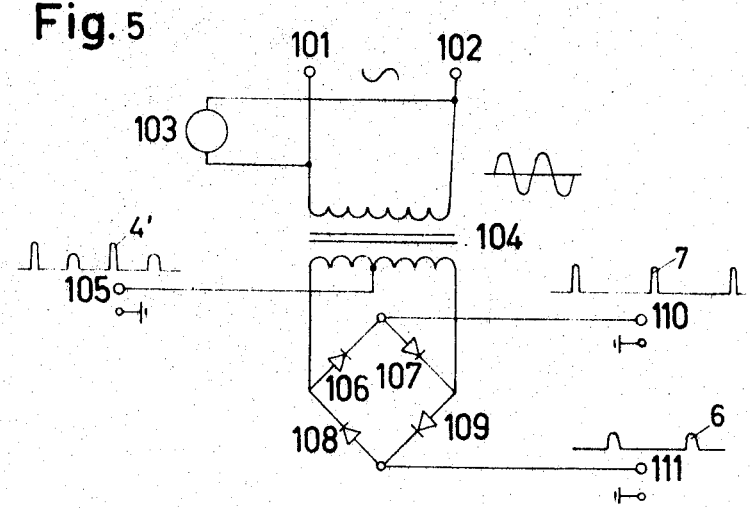
Figure 6:
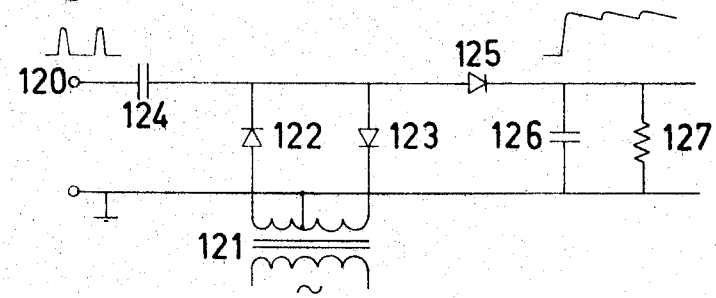
Figure 9:
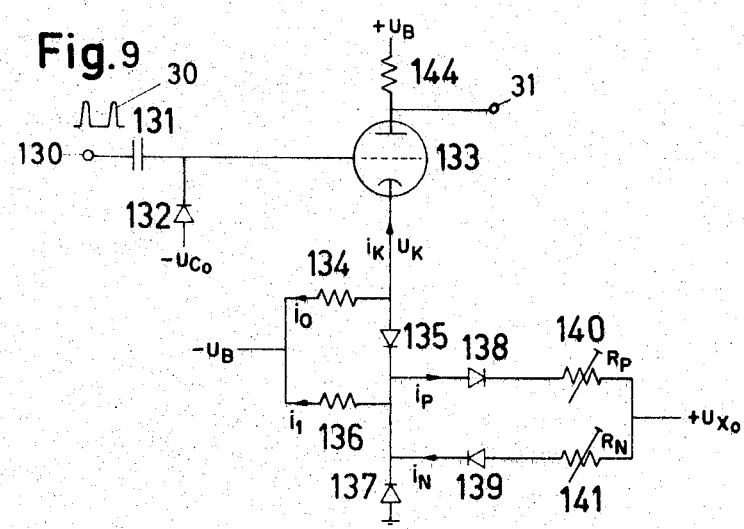
Figure 10:
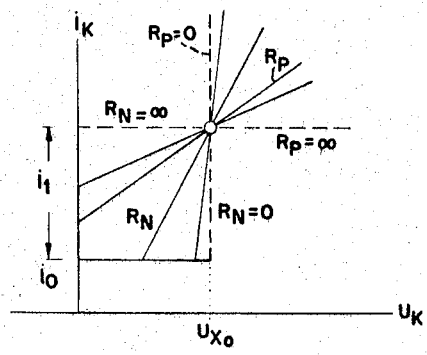
Figure 7:
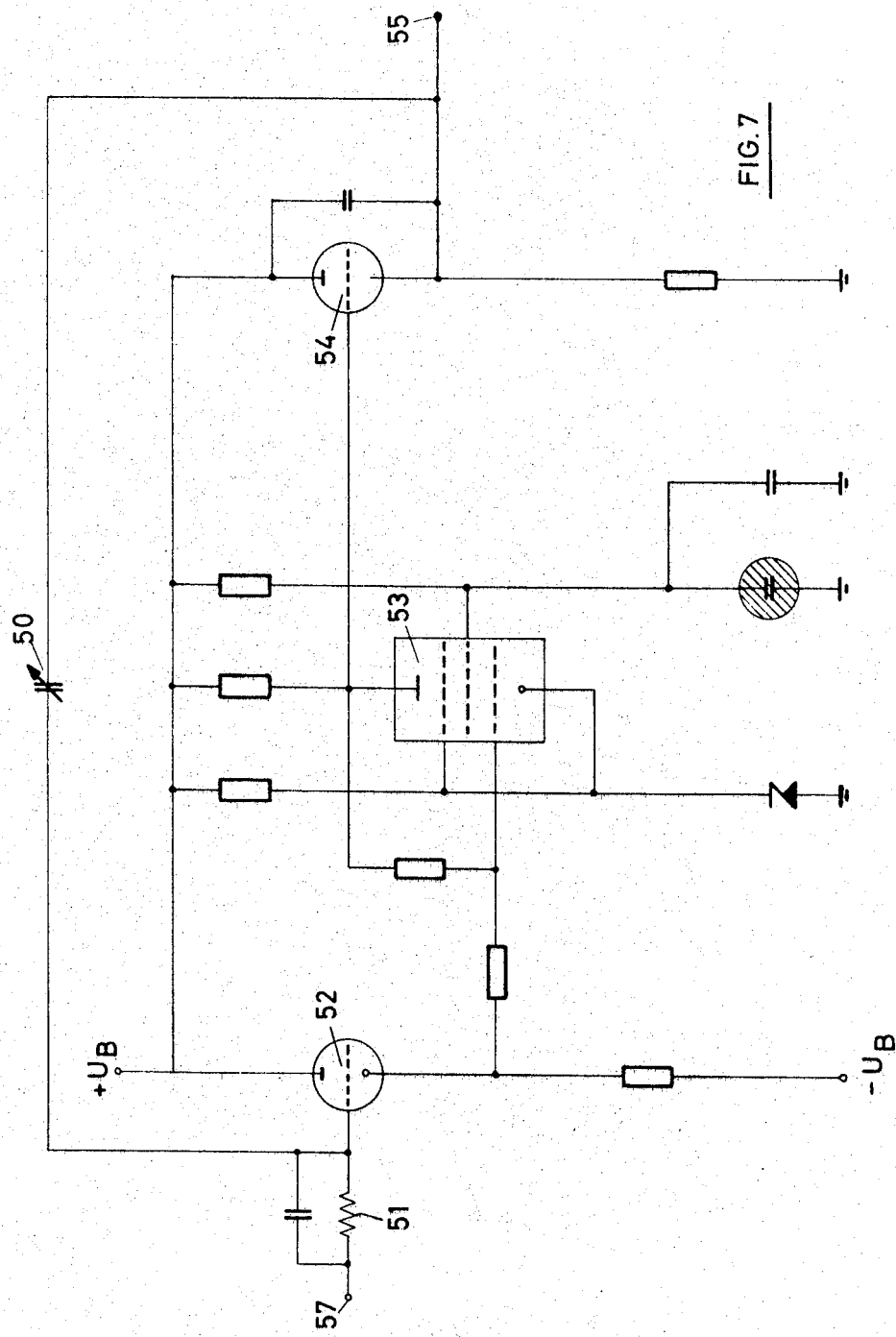
Figure 8:
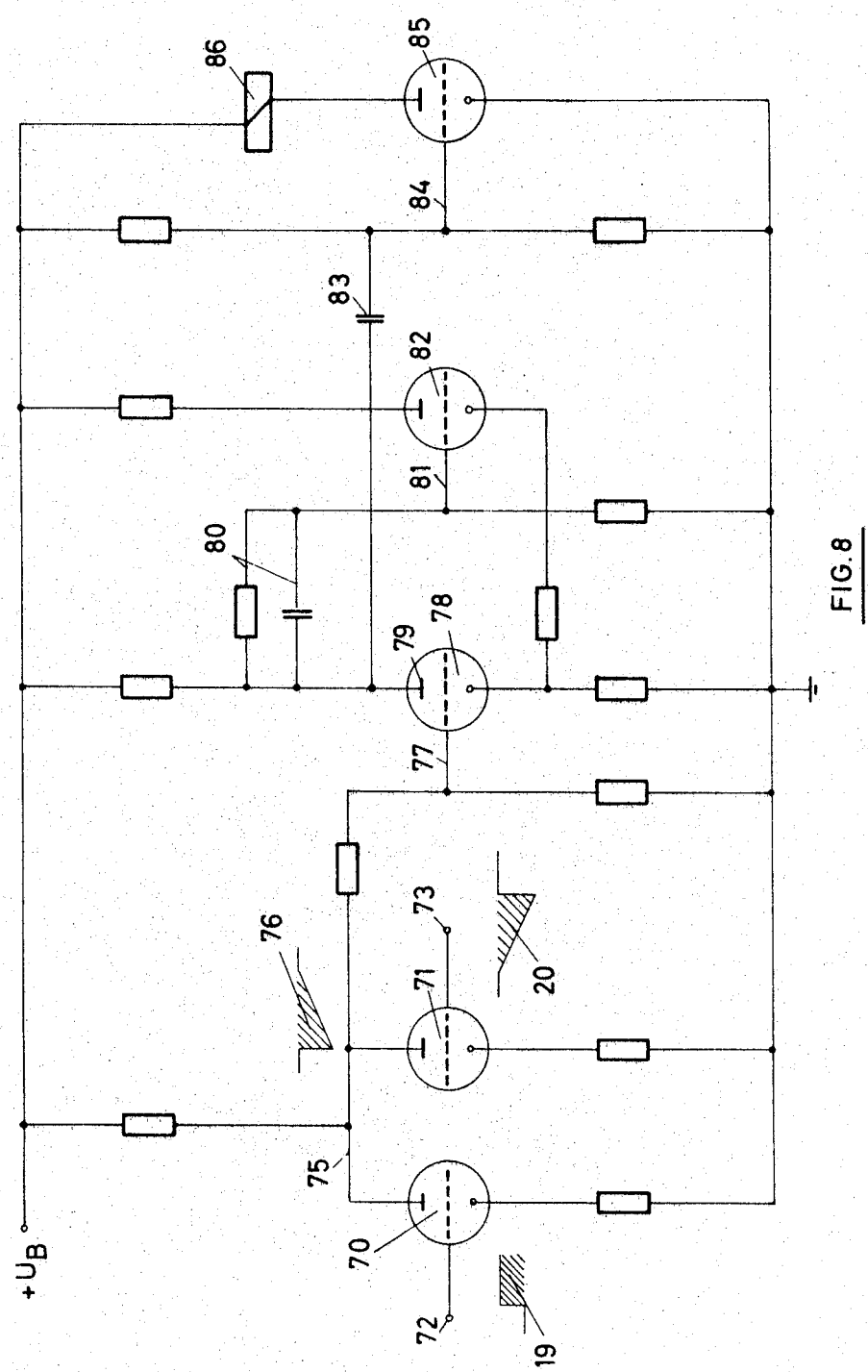
Figure 11:
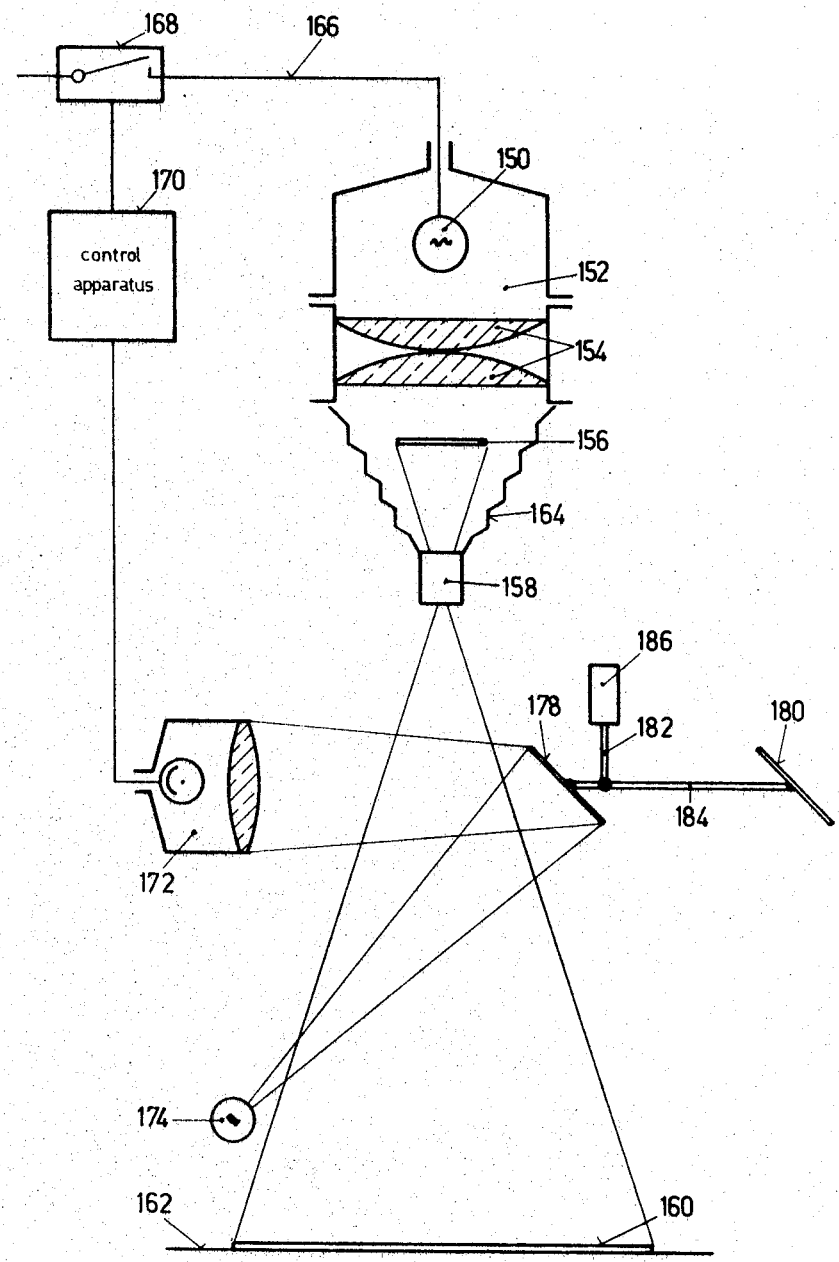

In order to enable the invention to be more readily understood, reference will now be made to the accompanying drawings, which illustrate diagrammatically and by way of example an embodiment thereof, and in which:

FIG. 1 is a block circuit diagram of the entire control apparatus in accordance with the invention, FIG. 2a shows the voltage form at the output of a photoelectric cell of the apparatus, FIG. 2b shows a reference pulse train, FIG. 2c shows a picture pulse train, FIG. 3 shows the characteristic of a non-linear element of the apparatus, FIG. 4 is a circuit diagram of an adjustable two-stage amplifier of the apparatus, FIG. 5 is a circuit diagram of a thyratron of the apparatus, FIG. 6 is a circuit diagram of a rectifier circuit of the apparatus, FIG. 7 is a circuit diagram of an integrator of the apparatus, FIG. 8 is a circuit diagram of a comparator of the apparatus, FIG. 9 is a circuit diagram of the non-linear element of the apparatus, and FIG. 10 shows the associated set of characteristic curves; and FIG. 11 shows a photographic printer of conventional construction including a control apparatus in accordance with the invention.

With reference now to FIG. 11, a photographic printer of conventional construction is shown, having an incandescent lamp 150 as the source of light. The lamp 150 is disposed within a lamphouse 152, which carries a condenser consisting of two lenses 154, behind which an original 156, for example a negative, is situated, said original being projected by an objective 158 on to a photo-sensitive photographic material 160 on a support 162. In order to avoid stray light, the rays travel between the original 156 and the projection lens 158 inside bellows 164. A supply cable 166 for the lamp 150 contains a switch 168 which is operable to control the time of exposure by means of a photosensitive element, consisting of a photoelectric cell arrangement 172, which is identical to the photoelectric cell 3 of FIG. 1, through a time control apparatus 170. This control apparatus constitutes the subject matter of the actual invention and will be explained now in detail.

Referring now to the block circuit diagram of FIG. 1, measurement light 1, which is branched from printing light and is chopped, falls intermittently, together with the likewise chopped light 2 of a highly stable reference lamp 174, see FIG. 11, upon the photoelectric cell 3 which delivers a correspondingly superimposed current pulse train 3′ to an amplifier 4.

The chopping of the two luminous fluxes at chronologically correct intervals may be effected for example by a mirror wheel, which alternately enters the two ray paths as shown in FIG. 11. This arrangement, which is already subject to my copending application Ser. No. 288,381, filed June 17, 1963, includes a mirror wheel 176, which consists of at least two mirrors 178 and 180 fastened on a hub 182 by arms 184, and driven by a motor 186 at constant speed. In the position shown in FIG. 11, the mirror 178 throws the light of the constant reference light source 174 on to the photoelectric cell 172. In a position where the mirror wheel is turned through 180° the mirror dips into the copying light rays and throws at least part of the copying light on to the photoelectric cell 172.

The combined and amplified electrical pulse train 4′ FIG. 2, is next split up again in a thyratron-gate 5 into its individual signals, and a picture pulse train 6 is fed to amplifiers 8 and 9, while a reference pulse train 7 is fed to an amplifier 18.

The time dependence of the three pulse trains 4′, 6 and 7 is illustrated in FIG. 2, where FIG. 2a shows the overall signal 4′ fed to the thyratron-gate 5, FIG. 2b the picture pulse 6 and FIG. 2c the reference pulse train 7.

The reference pulse train 7, having been amplified in the amplifier 18, is then rectified in a rectifier circuit 24, so that a continuous voltage corresponding to the pulse amplitude is available at the output 19 of the rectifier circuit.

The picture pulse train 6 passes through amplifiers 8, 9, 10, 11, 12, 13 and 14, a non-linear element 33, amplifiers 15 and 16, a rectifier circuit 32 and an integrator 17. The voltage which reaches the integrator is integrated there to a continuous voltage which is available at the integrator output 20.

The two continuous voltages which occur at the output 19 of the rectifier circuit 24 and at the output 20 of the integrator 17 are compared with one another by means of a comparator 25, which delivers a pulse via its output 21 in the case of voltage equality. This pulse trips the end of the exposure by opening switch 168, FIG. 1.

The non-linear element 33, which consists of an electrical network, shapes the pulses arriving at its input 30 in accordance with a non-linear amplitude characteristic. A number of possible characteristics for the non-linear element 33 are illustrated in FIG. 3, in which "input $x$" ($x$-axis) corresponds to the voltage at the input 30 (FIG. 1), and "output $y$" ($y$-axis) to the voltage at the output 31 (FIG. 1).

The curves 60$a$, 60$c$, 60$d$, and 61 pass through a common point P, so that for the signal amplitude $x=x_0$, the output signal $y=y_0$ appears for all possible adjustment of the non-linear element. The characteristic curve can therefore be represented as $$\frac{y}{y_0} = \left(\frac{x}{x_0}\right)^b$$

where $b$ is the parameter for the family of curves. In the example of FIG. 3, $b$ is less than 1 for the curves 60$a$ and 60$b$, greater than 1 for the curves 60$c$ and 60$d$ and equal to 1 for the straight line 61. In the case of this straight line with $b=1$, the non-linear network 33 (FIG. 1) operates as an ordinary linear amplifier.

Experience shows that the range of $b$ can be chosen small and values between 0.8 and 1.2 are entirely satisfactory. Since furthermore the standardised input amplitudes $x/x_0$ can be made to deviate only slightly from the value 1, the characteristic curve may be replaced by their tangents at the point P. These have the slope $b$ and follow the equation $$\frac{y}{y_0} = (1-b) + b\left(\frac{x}{x_0}\right)$$

It is necessary to fix a reference point for the non-linear shaping of an incoming signal, and this point is combined here with the point P. A direct current potential corresponding to this point and obtainable at a terminal 29 of the non-linear element 33 is compared, for calibration purposes, with the pulse crest value of the signal after the amplifiers 8 and 9, and after the amplifiers 10 and 11 respectively (FIG. 1). This is done by a zero balance instrument 28 which can be connected selectively to the points 22 or 23 of the circuit via switches 26 and 27.

The overall gain of the amplifiers 4, 8 and 9 is now adjusted in such a way that, for exposure without a negative—i.e., with the negative window empty—the instrument 28 gives no reading with the switch 27 closed. The amplifier 9 then compensates the differences of the individual exposure colours—i.e., its gain factor is commuted with the exposure colour so that the pulse amplitude possesses the same value at the point 22 of each colour. The amplifier 8 compensates the differences in the optical conditions of the light measuring device in corresponding manner. Thus, for every combination of a negative/positive format, the gain factor is adjusted so that the pulse amplitude voltage at the point 22 remains constant. The adjustment of the negative/positive format combination may conveniently be combined with a locking device such as described in my co-pending United States application Ser. No. 350,365, filed March 9, 1964.

The amplifier 4 may have its gain factor regulated manually and allows for the fluctuations in the intensity of the printing light source and in the sensitivity of the photoelectric cell (separately and commutably for the three colours).

The overall gain of the amplifiers 10 and 11 is regulated, after adjusting the amplifiers 4, 8, 9, in such a way that when a so-called "standard negative" (a standard-exposed negative recognised as typical for the entire production) is exposed the instrument 28 indicates the value 0 when the switch 26 is closed. The gain factors of the amplifiers 10 and 11 must be commutated with the corresponding printing light colour for the three colours.

Since the pulse crest voltage at the point 22 in the case of exposure without a negative was likewise adjusted to the corresponding continuous voltage of the point 29 before the gain factors of the amplifiers 10 and 11 were adjusted, the overall gain factor of the amplifiers 10 and 11 is equal to the reciprocal of the transparency of the standard negative.

The division of the gain factor between the two amplifiers 10 and 11 permits a digital decadic adjustment. For example, let the gain factor of the amplifier 10 be adjustable in steps of $2^n$—i.e., 1, 2, 4, 8 etc.—and that of the amplifier 11 in steps $2^{m/10}$—i.e., 1, $2^{1/10}$, $2^{2/10}$, $2^{3/10}$ ... up to $2^{9/10}$. The overall gain factor is then equal to $$2^n \cdot 2^{m/10} = 2^{(n+m/10)}$$

The amplification is thus geometrically stepped and adjustable in a tens decade ($n$) and a units decade ($m$).

The logarithm to the base 10 of this amplification must correspond, in accordance with what has been stated hereabove, to the logarithm to the base 10 of the reciproal transparency of the standard negative, and therefore by definition to its density D:

$$D = \log_{10} 2^{(n+m/10)} = (n+m/10) \log_{10} 2 \approx 0.3^{(n+m/10)}$$

An increase in the standard negative density 0.03 would therefore correspond to an increase in the amplifier 11 by 1 gain step $2^{1/10}$.

When the amplifiers 4, 8, 9, 10 and 11 have been used for correcting the deviations independent of the individual negative, the amplifiers 12, 13 and 14, since they are arranged after the points 23 of the circuit and are therefore no longer affected by the periodically occurring zero balance, are used to compensate transparency differences between the individual negatives.

The amplifier 12 takes into account colour deviations, and the amplifier 13 density deviations of the negatives as ascertainable by preliminary assessment or subsequent correction. The amplifier 14 may be used with fixed corrections for special corrections which frequently occur (e.g., artificial light photograph on daylight film). The gain factors of the amplifiers 12 and 13 are conveniently adjusted in steps which correspond to those of the amplifiers 10 and 11. This adjustment is effected, for example, via push buttons.

The difference between the amplifiers 12 and 13 is that the gain of the amplifier 12 is commuted with the printing colour, whereas that of the amplifier 13 is constant for all printing colours.

The gain factors of the amplifiers 12, 13 and 14 are adjusted in such a way that, without colour, density and special corrections i.e., from negatives which correspond in their structure to the standard negative) the overall amplification is equal to 1. Thus, for the standard negative, the pulse crest voltage at the point 30 is equal to that at the point 23, which in turn is identical with the continuous voltage at the point 29. The voltages at the points 30 and 29 are thus equal in the case of the standard negative, and correspond to the input $x_0$ from FIG. 3.

For the standard negative, and for negatives corresponding to the latter, there therefore appears at the output 31 of the non-linear element 33 a voltage which is always the same, independently of the shape of the curve of the non-linear element and independently of all optical data of the instaneous printing position (lens, colour, sensitivity of photoelectric cells, etc.), and corresponds to the output $y_0$ from FIG. 3. Every deviation from the standard negative, unless dictated by the picture composition and therefore corrected by the amplifiers 12, 13 and 14, modifies the voltage at the input 30 of the non-linear element 32, and hence the voltage at the output 31 of the non-linear element, depending upon the curve shape (60$a$ to 60$d$ or 61 from FIG. 3) adjusted in the non-linear element. The variation is superproportional for $b=1$, subproportional for $b=0$ and proportional for $b=1$.

The output 31 of the non-linear element 33 is connected via the amplifiers 15 and 16 to the input of the rectifier circuit 32. This rectifier circuit 32 transmits to the integrator 17 a continuous voltage proportional to the input pulse amplitude.

The amplifier 15 has fixed gain factors, commutable with the enlargement, to allow for the lengthening of the exposure time with increasing enlargement. These gain factors are conveniently commutable with the negative/positive format combination choice already referred to.

The amplifier 16 takes into account the exposure time variation due to the change of emulsion on the positive paper.

It is convenient from electrical considerations to effect major modifications on the exposure time, not by the amplifier 16, but by the time constant $\tau$ of the integrator 17.

As in the case of the standard negative (amplifiers 10 and 11), a digital decadic adjustment may be achieved also at the integrator and amplifier 16. To this end, the time constant $\tau$ (principally that of the integration condenser) is commuted in steps of $2^i$ ($i=1, 2, 3 \ldots$) — i.e., 1, 2, 4, 8, 16, ... and the amplifier 16 in steps of $2^{k/10}$—i.e., $2^{1/10}$, $2^{2/10}$ ... up to $2^{9/10}$. All these steps must of course be commuted with the printing light colour.

The amplifier 18 present in the reference channel has a fixed gain. The rectifier circuit 24 is built up similarly to the rectifier circuit 32.

The gain of the amplifier 4 is inversely proportional to $\phi_0 \cdot S$, where $\phi_0$ represents the light flux of the printing light source and $S$ the sensitivity of the photoelectric cell. The voltage $$U_7 = \frac{c_1 S'}{\phi_0 \cdot S}$$

is therefore present at the point 7, $c_1$ denoting a constant, $S$ the sensitivity of the photoelectric cell 3 at the time of tuning the amplifier 4, and $S'$ the interim sensitivity variation of the photoelectric cell at any other time. Immediately after balancing, $S=S'$, whereas at any other time we have: $S'=S \pm \Delta S$. Lastly, if the gain of the amplifier 18 is designated $v_{18}$, then the voltage $$u_R = u_7 \cdot v_{18} = \frac{c_1 \cdot v_{18} \cdot S'}{\phi_0 \cdot S}$$

passes via the rectifier circuit 24 to the computer 25.

In the case of the standard negative, and referred to the designation $x$ from FIG. 3, the voltage $$x = x_0 \cdot \frac{\phi_0' \cdot S'}{\phi_0 \cdot S}$$

is present at point 30, if $\phi_0$ and $S$ are the values at the time of balancing the amplifier 4 and $\phi_0'$ and $S'$ the values at the time of printing any desired negative. Immediately after balancing, $\phi_0' \cdot S' = \phi_0 \cdot S$. Let any desired negative have the mean transparency $\overline{T}$ the standard negative a value $\overline{T}_n$, and the voltage at point 30 becomes $$x = x_0 \frac{\phi_0' \cdot S'}{\phi_0 \cdot S} \cdot \frac{\overline{T}}{\overline{T}_n}$$

Lastly, if a correction of total value $\chi$ be included in the amplifiers 12, 13 and/or 14 (free of correction: $\chi=1$), then the voltage at point 40 is modified to $$x = x_0 \frac{\phi_0' S'}{\phi_0 \cdot S} \cdot \frac{\overline{T}}{\overline{T}_n} \cdot \chi$$

In accordance with the approximate formula $$\frac{y}{y_0} \approx (1-b) + b\frac{x}{x_0}$$

stated higher up, the voltage $$y = (1-b)y_0 + b\frac{\phi_0' S'}{\phi_0 S} \cdot \frac{\overline{T}}{\overline{T}_n} y_0$$

is present at the output 31. This voltage is amplified in the amplifiers 15 and 16 correspondingly to their gain factors $v_{15}$ and $v_{16} = k/10$ ($k=1, 2, 3 \ldots$), so that a voltage $$u_{17} = y \cdot v_{15} \cdot 2^{k/10}$$

passes via the rectifier circuit 32 to the input of the integrator 17.

The integrator integrates this input voltage $u_{17}$ into an output voltage $u_B$ $$u_B = \frac{t}{\tau} \cdot u_{17}$$

where $\tau$ denotes the integration time constant. Let this be likewise adjustable in steps $\tau = \tau_0 \cdot 2^{-i}$. The voltage $$u_B = \frac{y \cdot v_{15} \cdot 2^{(i+k/10)}}{\tau_0} \cdot t$$

is thus present at the input 20 of the comparator 25.

The comparator 25 delivers, via its output 21, a pulse to stop the exposure ($t=t_{exp}$) when voltages of equal magnitude occurs at its two inputs 19 and 20. Therefore, for $u_R=u_B$: and with the above relations, we obtain $$\frac{c_1 \cdot v_{18} \cdot S'}{\phi_0 \cdot S} = \frac{y \cdot v_{15} \cdot 2^{(i+k/10)}}{\tau_0} \cdot t_{exp}$$

Solving this equation for $t_{exp}$, it follows that $$t_{exp} \cdot \frac{c_1}{\phi_0'} \cdot \frac{v_{18}}{v_{15}} \cdot \frac{\tau_0}{y_0} \cdot \frac{1}{2^{(i+k/10)} \cdot b\frac{\overline{T}}{\overline{T}_n}} \cdot \frac{1}{1+\left(\frac{1}{b}-1\right)\frac{\overline{T}_n S \phi_0}{\chi \overline{T} S_0' \phi_0'}}$$

or the mean printing light time integral $$L = t_{exp} \cdot \phi_0 \cdot \overline{T}$$

$$L = \frac{c_1}{2^{(i+k/10)}} \cdot \frac{v_{18}}{v_{15}} \cdot \frac{\tau_0}{y_0} \cdot \frac{\overline{T}_n}{\chi \cdot b} \left[1 + \left(\frac{1}{b}-1\right) \cdot \frac{\overline{T}_n}{\overline{T}} \cdot \frac{S\phi_0}{S'\phi_0'}\right]^{-1}$$

The determination of $L=L_0$ for the standard negative ($b=1$, $\chi=1$) yields the expression $$L_0 = \frac{1}{2^{(i+k/10)}} \cdot \frac{v_{18}}{v_{15}} \cdot \frac{\tau_0}{y_0} \cdot \overline{T}_n$$

The enlargement compensation is stored in the gain factor $v_{15}$, and the basic sensitivity of the emulsion in $i$ and $k$. In the general case, therefore $$L = L_0 \cdot \frac{\left[1 - \frac{b-1}{b} \cdot \frac{\overline{T}_n}{\overline{T}} \cdot \frac{S\phi_0}{S'\phi_0'}\right]^{-1}}{\chi \cdot b}$$

The last statement clearly demonstrates the variation of the mean printing light time integral with the mean negative transparency $\overline{T}$, which functions in total independence of the other exposure parameters. It follows further from this that variations in the sensitivity of the photoelectric cell enter the printing light time integral L only as second order errors, since the parameter value $b$ is shown by experience to be extremely close to 1, and the righthand term of the numerator (last formula for L) becomes small.

The circuit construction of the amplifiers 4, 8, 9, 10, 11, 12, 13, 14, 15, 16, 18 is effected in accordance of one of the customary methods for alternating current amplifiers.

FIG. 4 shows construction of such an amplifier, which comprises a two-stage amplifier part with negative feedback and, in series, a likewise two-stage cathode follower.

The input signal passes via a terminal 40 into a first cathode follower stage $K_1$ and is first of all attenuated in its cathode network correspondingly to the parameters provided for this amplification stage and separately for the three separation colours. The choice of the separation colour is made here by a switch 41, whereas a network is provided for balancing the parameter variations, and is represented here in simplified form by three potentiometers 42, 43 and 44. The cathode follower $K_2$ is constructed analogously to the first one ($K_1$) and constitutes the unit decade mentioned hereinbefore as distinct from the cathode follower $K_1$ which constitutes the tens decade.

The amplifier V itself is formed by a two-stage amplifier having triodes 46 and 47 with negative feed-back via an RC-network 45. The output signal finally appears at a terminal 48.

The thyratron circuit 5 (FIG. 1) is synchronised with the means—e.g., the mirror wheel—which generates the light pulses. FIG. 5 illustrates the circuit for the case where the mirror wheel (not shown) is driven by a synchronous motor 103. There is then applied to terminals 101 and 102 an alternating voltage which operates the mirror wheel synchronous motor 103 and a transformer 104. The input signal 4' is fed into the central tapping of the secondary winding of the transformer 104 via terminals 105. Depending upon the polarity of the alternating voltage and the transformer, either diode pairs 106/107 or 108/109 conduct, so that the input 105 is switched through to a terminal 110 in phase with the alternating voltage in the one half wave, and to a terminal 111 in the other half wave.

The rectifier circuits 17 and 24 conveniently comprise a levelling which detects the foot of the pulses and a crest rectifier which converts the amplitude of the pulse into a continuous voltage. A suitable exemplary circuit for this is shown in FIG. 6. The same network as in FIG. 5 (101/102) feeds a transformer 121 which cuts off diodes 122 and 123 during one alternating voltage half wave and makes them conduct during the other half wave. This half wave is required to coincide with the foot of the pulse—i.e., with the pulse interval—so that during this interval a condenser 124 is charged in such a way that its right-hand side is earthed. A diode 125 charges a smaller condenser 126 to the maximum value of the pulse voltage, which is stored with the time constant given by an RC element 126/127.

The integrator 17 may be a so-called Miller integrator. Such integrators are known from the analogue computer art.

FIG. 7 shows a simple construction of a Miller integrator the amplifier part being constructed here as a pentode and having a cathode follower each connected in series in front of and behind it for impedance transformation. An input signal 32', which appears at a terminal 57 in the form of a positive potential jump, charges a condenser 50 via a resistance 51, the voltage being kept reasonably constant by means of a series-connected amplifier in order to improve the linearity of integration. Charging of the condenser 50 via the resistance 51 produces, first of all, a positive modification of the grid voltage of a triode 52, and hence a positive modulation of the amplifier pentode valve 53, a pentode with a high $\mu$ being chosen here in order to obtain as large as possible a gain factor. Due to the increased pentode current, the potential at its anode diminishes, and so consequently does that at the grid of a triode 54 which passes this negative voltage jump to the output 55 of the cathode follower and again, via the condenser 50, to the grid of the triode 52. The grid of the triode therefore exhibits a chronologically constant potential with respect to earth, whereas a potential diminishing linearly with the time is obtainable at the terminal 55. The integration time constant is formed substantially by the product $\tau = RC$ and can be adapted to the conditions of integration formulated hereinbefore by modifying the variable condenser 50.

The comparator 25 may be constructed as a Schmitt trigger (cathode-coupled bi-stable multi-vibrator) or as a monostable multi-vibrator. An exemplary circuit for this is shown in FIG. 8, this diagram being reduced to its essential elements. The two direct current signals 19 and 20 required to be compared are first added in an addition stage and passed to the input of a Schmitt trigger which, when a certain switching voltage is reached, delivers a pulse via an amplifier to a relay 86 which trips the end of the exposure.

The addition of the two signals is performed in a differential amplifier constituted of the two triodes 70 and 71, the reference signal 19 being applied in the form of a negative voltage jump to the grid terminal 72 of the triode 70, and the integrated picture signal with positive slope being applied to the grid terminal 73 of the triode 71. At the common anode 75 an added signal 76 is produced which is fed via a cathode follower, not shown, to the grid 77 of a triode 78 of the Schmitt-trigger, which is at first still cut-off. When a certain grid voltage $U_g$, which is preferably chosen to equal $$\frac{R_1}{R_1 + R_2} U_a$$

is reached, where $U_a$ denotes the anode voltage at 75 at the moment of equality of the two input signals 19 and 20, the valve 78 begins to conduct and transfers the voltage gradient occurring in its anode 79 via a network 80 to the grid 81 of a triode 82, causing the latter to begin to cut-off. The process is cumulative and is complete when the triode 82 is cut-off and the triode 78 conducts. The voltage pulse thereby produced at the anode 79 is passed via a condenser 83 to the grid 84 of an amplifier triode 85 and is transmitted after amplification to the relay 86, which thereby changes its state and trips the end of the exposure.

The non-linear element 23 may be in the form, for example, of a valve with non-linear cathode resistance. A preferred construction is shown in FIG. 9, and is explained in greater detail hereinbelow.

The positive pulse series 30 which arrives at the input 130 is levelled in a condenser 131 and a diode 132 in manner known per se, so that the pulse foot is at a voltage $-U_{Co}$ at the grid of a valve 133. The valve derives a cathode quiescent current $i_o$ from a negative supply voltage $-U_B$ via a high ohmic resistance 134. The voltage $-U_{Co}$ and the current $i_o$ are matched in such a way that in the absence of a pulse—i.e., in the pulse intervals—the cathode is at zero volts. If the input pulse has a height such that the cathode rises to the voltage $+U_{xo}$, then a diode 135 conducts and draws an additional cathode current $i_1$ through an high ohmic resistance 136. A diode 137 is cut-off. No current flows through resistances 140 and 141, since there is no potential difference across them. In this case, therefore—independently of the resistances 140 and 141—the constant cathode current $i_o + i_1$ flows. If the input voltage increases, then the cathode voltage rises above $U_{xo}$. A diode 138 begins to conduct, and it is possible for an additional cathode current $i_p$ to flow, the value of which depends upon the deviation of the cathode voltage from $U_{xo}$ and upon the resistance 140. If the input voltage decreases, then the cathode voltage falls below $U_{xo}$, a diode 149 begins to conduct and withdraws from the cathode a current $i_N$, the value of which depends upon the deviation of the cathode voltage from $U_{xo}$ and upon the resistance 141. The diode prevents the cathode current from falling below $i_o$, and the diode 137 produces a steep current drop at zero cathode voltage. The cathode current can be obtained as a voltage via the anode resistance 144.

FIG. 10 shows in a graph the relationship between the cathode current and the anode voltage. Comparison with FIG. 3 shows that the voltage $U_{xo}$ corresponds to the input quantity $x_o$, and the current $i_1$ to the output quantity $y_o$.

The characteristics of the current curves can be further varied by further diode sections.

The circuit shown in FIG. 9 is of great advantage, particularly because signals which are greater or less than $U_{xo}$ can be shaped separately. This means in practice that negatives which are denser than the standard negative can be corrected independently of those negatives which are less dense than the standard negatives. This effect is expressed in FIG. 10 in that an upper family of curves and a lower family of curves can be rotated independently about a fixed datum point $U_{xo}/i_1$.

The parameters of the upper family of curves are here designated $R_P$ and the parameters of the lower family of curves $R_N$. The two corresponding resistances 141 and 140 are preferably each connected to a step switch, so that excellent reproducibility of the non-linear element is ensured at all times.

The variable resistances 140 and 141 are also present in triplicate and are switchable into circuits selectively, thus permitting the non-linear pulse amplitude shaping to be performed separately for all three separation colours.

This circuit is of course not constrained to the fact that the signal is present in pulse form; a continuous voltage could also be handled in the same way. In this case, the leveller 131/132 is omitted.

The gain factor of the amplifiers used may also be equal to or smaller than unity. In the latter case, the amplifiers act as attenuators.

What is claimed is:

1. Apparatus for controlling the exposure in a photographic printing machine of the kind in which the duration of exposure is controllable by measurement of the light passed from the original to the copy, comprising a first light source for illuminating said original, an additional light source adapted to provide an intensity reference, a photosensitive element intended to receive light passed from said original and light from said additional light source, means for directing at least part of the printing light and the reference light alternately and for brief periods onto said photosensitive element, said photosensitive element being arranged to transform the light pulses into electrical signals, a thyratron-gate adapted to be fed with said electrical signals and arranged to split them into a picture pulse train and a reference pulse train, a comparator, a first channel for said picture pulse train, a second channel for said reference pulse train, each such channel leading from said thyratron-gate to the first and second input of said comparator respectively, said first channel including amplifier means in series, adapted to multiplicatively influence the amplitudes of said picture pulse train in such channel, means for adjusting the gain factor of said amplifier means to required correction values, an integrator in said first channel disposed adjacent to the first input of said comparator, and a switching-off device operatively connected to the output of said comparator for switching off said first light source when the signal amplitude of the first input of said comparator reaches the signal amplitude of the second input of said comparator.

2. The apparatus of claim 1, wherein an amplifier is provided between said photosensitive element and said thyratron-gate.

3. Apparatus for controlling the exposure in a photographic printing machine of the kind in which the duration of exposure is controllable by measurement of the light passed from the original to be copied, comprising a first light source for illuminating said original, an additional light source adapted to provide an intensity reference, a photosensitive element intended to receive light passed from said original and light from said additional light source, means for directing at least part of the printing light and the reference light alternately and for brief periods onto said photosensitive element, said photosensitive element being arranged to transform the light pulses into electrical signals, an amplifier connected to said photosensitive element, a thyratron-gate connected to said amplifier and arranged to split said electrical signals into a picture pulse train and a reference pulse train, a comparator, a first channel for said picture pulse train, a second channel for said reference pulse train, each such channel leading from said thyratron to the first and second input of said comparator respectively, amplifier means arranged in series in said first channel and adapted to multiplicatively influence the amplitudes of said picture pulse train in such channel, means for adjusting the gain factor of said amplifier means to required correction values, a non-linear element connected in said first channel and arranged to non-linearly shape the pulse amplitude according to a previously selectable law, an integrator connected in said first channel between said non-linear element and the first input of said comparator, and a switching-off device operatively connected to the output of said comparator for switching off said first light source when the signal amplitude of the first input of said comparator equals or exceeds the signal amplitude of the second input of said comparator.

4. The apparatus of claim 3, wherein said amplifier disposed between the photosensitive element and said thyratron-gate has a regulable gain factor, whereby equal multiplicative influencing of the picture pulse train and reference pulse train is possible.

5. The apparatus of claim 3, wherein the non-linear element has a selectively adjustable characteristic.

6. The apparatus of claim 5, wherein the non-linear element has a datum point which remains unchanged during the adjustment of the characteristic.

7. The apparatus of claim 6, wherein the branches of the characteristic located on the two sides of the datum point are adjustable in mutual interdependence, so that the characteristic for input signals which are smaller than the voltage of the datum point can be adjusted independently of the characteristic for input signals which are greater than the voltage of the datum point.

8. The apparatus of claim 3, wherein said integrator has an adjustable integration time constant.

9. Apparatus for controlling the exposure in a photographic printing machine of the kind in which the duration of the exposure is controllable by measurement of the light passed from the original to be copied, comprising a first light source for illuminating said original, an additional light source adapted to provide an intensity reference, a photosensitive element intended to receive light passed from said original and light from said additional light source, means for directing at least part of the printing light and the reference light alternately and for brief periods onto said photosensitive element, said photosensitive element being arranged to transform the light pulses into electrical signals, an amplifier connected to said photosensitive element, a thyratron-gate connected to said amplifier and arranged to split said electrical signals into a picture pulse train and a reference pulse train, a comparator, a first channel for said picture pulse train, a second channel for said reference pulse train, each such channel leading from said thyratron-gate to the first and second input of said comparator respectively, a plurality of amplifiers arranged in series in said first channel and adapted to multiplicatively influence the signals amplitudes of said picture pulse train in such channel, means for adjusting the gain factors of said amplifiers in said first channel to required correction values, a non-linear element connected in said first channel for non-linearly shaping the pulse amplitude according to a previously selectable law, said non-linear element having a characteristic which is selectively adjustable about a fixed datum point, an integrator disposed in said first channel between said non-linear element and the first input of said comparator, a zero instrument connectable between said non-linear element, amplifiers in said first channel, and switch means for establishing the connection of said zero instrument, whereby the input voltage of said datum point can be compared selectively with the voltage at the outputs of those amplifiers of which the gain factors are adjusted in dependence upon technical properties of the photographic printing machine, and a switching off device operatively connected to the output of said comparator for switching off said first light source when the signal amplitude of the first input of said comparator equals or exceeds the signal amplitude of the second input of said comparator.

10. The apparatus of claim 9, wherein the gain factor of at least two of the amplifiers in said first channel is adjustable so that no voltage difference occurs at the zero instrument in the case of an empty film window.

11. The apparatus of claim 9, wherein the gain factor of at least one of said amplifiers in said first channel is adjustable correspondingly to the luminosity differences caused by different format combinations.

12. The apparatus of claim 9, wherein the gain factor of at least one of said amplifiers in the first channel is adjustable correspondingly to the luminosity differences caused by different printing colours.

13. The apparatus of claim 9, wherein the gain factor of at least two of said amplifiers in said first channel is adjustable so that no voltage difference occurs at said zero instrument when a standard negative is inserted.

14. The apparatus of claim 9, wherein said integrator has an adjustable integration time constant.

15. Apparatus for controlling the exposure in a photographic printing machine of the kind in which the duration of exposure is controllable by measurement of the light passed from the original to be copied, comprising a first light source for illuminating said original, an additional light source adapted to provide an intensity reference, a photosensitive element intended to receive light passed from said original and light from said additional light source, means for directing at least part of the printing light and the reference light alternately and for brief periods onto said photosensitive element, said photosensitive element being arranged to transform the light pulses into electrical signals, an amplifier connected to said photosensitive element, a thyratron-gate connected to said amplifier and arranged to split said electrical signals into a picture pulse train and a reference pulse train, a comparator, a first channel for said picture pulse train, a second channel for said reference pulse train, each such channel leading from said thyratron-gate to the first and second input of said comparator respectively, a first plurality of amplifiers arranged in series in said first channel and adapted to multiplicatively influence the amplitudes of said picture pulse train in such channel, means for adjusting the gain factors of said amplifiers in dependence upon values selected from the technical properties of the photographic printing machine and from a standard negative, a second plurality of amplifiers each arranged in series and the two pluralities arranged in series to one another in said first channel, means for adjusting the gain factors of said second plurality of amplifiers correspondingly to the original required to be printed, a non-linear element in said first channel connected via its input to the output of the last amplifier of said second plurality of amplifiers, said non-linear element being adapted to non-linearly shape the pulse amplitude according to a previously selectable law and having a characteristic which is selectably adjustable about a fixed datum point, a third plurality of amplifiers arranged in series in said first channel, the input of the first amplifier of said third plurality of amplifiers connected to the output of said non-linear element, means for adjusting the gain factors of said third plurality of amplifiers in dependence upon values selected from the selective scale of enlargement of the original and from the properties of the printing paper, a rectifier circuit connected via its input to the output of the last amplifier of said third plurality of amplifiers, an integrator connected via its input to the output of said rectifier circuit and via its output to the first input of said comparator, and a switching-off device operatively connected to the output of said comparator for switching off said first light source when the signal amplitude of the first input of said comparator equals or exceeds the signal amplitude of the second input of said comparator.

16. The apparatus of claim 15, wherein at least two of all said amplifiers in said first channel are associated with one individual correction value, and the gain factor of each of these amplifiers is adjustable in steps of different value according to a geometric series.

17. The apparatus of claim 16, wherein the gain factors are adjustable by a fine stepping according to the series $2^{n/10}$ and a coarse stepping according to the series $2^n$, where $n$ is selected from zero and positive integers.

18. The apparatus of claim 15, wherein at least two of all said amplifiers in said first channel constitute a decadic system.

19. The apparatus of claim 15, wherein the integrator has a time constant which is adjustable in steps constituting a geometric series.

20. The apparatus of claim 15, wherein the gain factor of the amplifier of said third plurality of amplifiers located in front of said integrator is controllable in steps constituting a geometric series, and wherein the integration time constant of the integrator is also adjustable in steps constituting a geometric series, the step regulation of such amplifier and the integrator jointly constituting a decadic system.

References Cited by the Examiner

UNITED STATES PATENTS

| | | | |
|---|---|---|---|
| 2,528,924 | 11/1950 | Vassy | 88—14 |
| 2,561,243 | 7/1951 | Sweet | 88—14 |
| 3,039,353 | 6/1962 | Coates et al. | 88—14 |

JULIA E. COINER, *Primary Examiner.*